United States Patent
Nojiri et al.

(10) Patent No.: US 7,418,975 B2
(45) Date of Patent: Sep. 2, 2008

(54) FUEL CUTOFF VALVE

(75) Inventors: Masanori Nojiri, Aichi-ken (JP); Tomohide Aoki, Aichi-ken (JP)

(73) Assignee: Toyoda Gosei Co., Ltd., Aichi-pref. (JP)

( * ) Notice: Subject to any disclaimer, the term of this patent is extended or adjusted under 35 U.S.C. 154(b) by 260 days.

(21) Appl. No.: 11/231,899

(22) Filed: Sep. 22, 2005

(65) Prior Publication Data

US 2006/0065305 A1    Mar. 30, 2006

(30) Foreign Application Priority Data

Sep. 29, 2004    (JP)    ............... 2004-283766

(51) Int. Cl.
*F16K 24/04* (2006.01)
(52) U.S. Cl. ........................ 137/202; 137/43
(58) Field of Classification Search ............... 123/516, 123/518–520, 198 D; 137/15.26, 43, 202, 137/423, 429, 430, 587
See application file for complete search history.

(56) References Cited

U.S. PATENT DOCUMENTS

| | | | | |
|---|---|---|---|---|
| 4,989,629 A | * | 2/1991 | Shirakawa | 137/202 |
| 5,065,782 A | * | 11/1991 | Szlaga | 137/39 |
| 5,082,016 A | * | 1/1992 | Nakamura | 137/202 |
| 5,172,714 A | * | 12/1992 | Kobayashi et al. | 137/202 |
| 5,313,978 A | * | 5/1994 | Takaki et al. | 137/43 |
| 5,392,804 A | * | 2/1995 | Kondo et al. | 137/202 |
| 5,497,800 A | * | 3/1996 | Ohashi et al. | 137/110 |
| 5,511,577 A | * | 4/1996 | Richards et al. | 137/202 |
| 5,590,697 A | * | 1/1997 | Benjey et al. | 137/43 |
| 5,755,252 A | * | 5/1998 | Bergsma et al. | 137/202 |
| 5,836,341 A | * | 11/1998 | Ayers et al. | 137/202 |
| 6,035,884 A | * | 3/2000 | King et al. | 137/202 |
| 6,311,675 B2 | * | 11/2001 | Crary et al. | 123/516 |
| 6,494,227 B2 | * | 12/2002 | Hattori et al. | 137/43 |
| 6,591,855 B2 | * | 7/2003 | Nishi et al. | 137/202 |
| 6,981,514 B2 | * | 1/2006 | Nishi | 137/202 |
| 2001/0011538 A1 | * | 8/2001 | Crary et al. | 123/509 |

FOREIGN PATENT DOCUMENTS

JP    A-H11-254980    9/1999

* cited by examiner

*Primary Examiner*—John Rivell
*Assistant Examiner*—Craig Price
(74) *Attorney, Agent, or Firm*—Posz Law Group, PLC

(57) ABSTRACT

A fuel cutoff valve of the invention attached to an upper portion of a fuel tank includes a casing, a first part supported by multiple legs, a second part, and a spring. The second part is located below the first part in a vertically movable manner and has multiple air holes formed in a top plate to communicate with a buoyancy chamber. When the fuel level in the fuel tank rises to submerge the second part and reach the first part, the first part rises by its buoyancy to close a connection conduit. In the event of an abrupt rise of the fuel level at a high increase rate, for example, by a sudden turn of the vehicle, the second part rises by the increased buoyancy of the buoyancy chamber by the air retained in the buoyancy chamber and presses the first part up to close the connection conduit. The fuel cutoff valve of the invention promptly closes in response to a heavy ruffle of the fuel level by a sudden turn of the vehicle, so as to prevent the outflow of the fuel from the fuel tank.

4 Claims, 5 Drawing Sheets

FUEL CUTOFF VALVE

This application claims the benefit of and priority from Japanese Application No. 2004-283765 filed Sep. 29, 2004, the content of which is incorporated herein by reference.

BACKGROUND OF THE INVENTION

1. Field of the Invention

The present invention relates to a fuel cutoff valve that is attached to an upper portion of a fuel tank and connects and disconnects inside with and from outside of the fuel tank according to the fuel level in the fuel tank.

2. Description of the Related Art

A proposed fuel cutoff valve has a casing with a connection conduit connected to outside of a fuel tank, a cylindrical float valve located in a valve chest in the casing, and a spring supporting the float valve (see JP-A-11-254980). The float valve closes the connection conduit when the fuel level exceeds a preset fluid level. A bottom plate attached to the bottom of the casing is movable in a vertical direction to open and close a connection hole communicating with the valve chest. In the event of an abrupt rise of the fuel level in the fuel tank, for example, by a sudden turn of a vehicle, the fuel level hits against and moves up the bottom plate of the fuel cutoff valve to close the connection hole. This prevents the outflow of the fuel from the fuel tank to a canister.

The structure of the related art fuel cutoff valve, however, does not ensure the smooth up-down motions of the bottom plate in the vertical direction and may not attain a prompt fuel cutoff in the event of an abrupt rise of the fuel level by a sudden turn of the vehicle.

SUMMARY OF THE INVENTION

The advantage of some aspects of the present invention is to provide a fuel cutoff valve of simple structure that promptly closes to prevent the outflow of a fuel from a fuel tank in the event of an abrupt rise of the fuel level, for example, by a sudden turn of the vehicle.

In order to attain at least part of the above and the other related objects, the aspect of the present invention is directed to a fuel cutoff valve tat is attached to an upper portion of a fuel tank and connects and disconnects inside with and from outside of the fuel tank according to a fuel level in the fuel tank. The fuel cutoff valve includes: a casing tat has a casing body forming a valve chest to communicate with the inside of the fuel tank and a connection conduit connecting the valve chest to the outside of the fuel tank; a first part that is received in the valve chest in a vertically movable manner and has a valve plug that moves up and down by motion of a fuel in the valve chest to close and open the connection conduit; and a second part that is made of a material having a greater specific gravity than a specific gravity of the fuel and has a body located below the first part in a vertically movable manner to form a buoyancy chamber and an air bole formed in a top face of the body to communicate with the buoyancy chamber.

The first part is structured to rise by buoyancy and close the connection conduit, in response to a rise of a fuel level. The second part is structured to make the air come out of the buoyancy chamber via the air hole and to interfere with an increase in buoyancy of the buoyancy chamber, in response to a rise of the fuel level at a preset relatively low increase rate. The second part has a resting state and a moving action in response to rise of the fuel level at a first preset rising rate and second preset rising rate higher than the first preset rising rate respectively. The resting state is a state that the second part makes the air come out of the buoyancy chamber via the air hole and to interfere with an increase in buoyancy of the buoyancy chamber, and rests at an original position. The moving action is an action that the second part retains the air in the buoyancy chamber and to rise by increased buoyancy of the buoyancy chamber, and to press the first part up, and then take the valve plug of the first part close the connection conduit.

In the structure of the fuel cutoff valve of the invention, in the event of a rise of the fuel level in the fuel tank at a relatively low increase rate in a tilted attitude of the vehicle, the inside of the fuel tank communicates with the outside via the valve chest and the connection conduit to release the fuel vapor out of the fuel tank. With the rise of the fuel level in the fuel tank, the first part receives a sufficient level of buoyancy to rise and close the connection conduit. This structure effectively prevents the outflow of the fuel from the fuel tank.

In the tilted attitude of the vehicle, the greater specific gravity of the second part than the specific gravity of the fuel and the relatively low rising rate of the fuel level cause the air to mostly come out of the buoyancy chamber via the air hole and interferes with an increase in buoyancy of the buoyancy chamber. At a higher fuel level than the fuel level submerging the second part, only the first part moves up and down to close and open the connection conduit. The structure of the invention is thus desirably applicable to a flat fuel tank having a fuel cutoff valve set in a closed position at a higher fuel level. In the event of an abrupt rise of the fuel level in the fuel tank at a high increase rate by a sudden turn of the vehicle, the second part rises by the increased buoyancy of the buoyancy chamber by the air retained in the buoyancy chamber and presses the first part up to close the connection conduit. The structure of the invention effectively follows the high rising rate of the first level caused by, for example, a sudden turn of the vehicle to promptly close the connection conduit.

In one preferable embodiment of the fuel cutoff valve of the invention, the first part is held by a spring placed on an upper face of the second part. In one preferable structure, the first part includes a top plate with a valve plug and multiple legs extended downward from an outer circumference of the top plate and arranged to surround an outer circumference of the second part. The first part may also include a guide mechanism that is protruded from a lower face of the top plate and is held by the casing.

In another preferable embodiment of the fuel cutoff valve of the invention, the casing has a bottom plate to support a lower end of the second part, and the first part is held by a spring placed on an upper face of the bottom plate.

DESCRIPTION OF THE PREFERRED EMBODIMENTS (1) General Structure of Fuel Cutoff Valve 10

Figure 1:
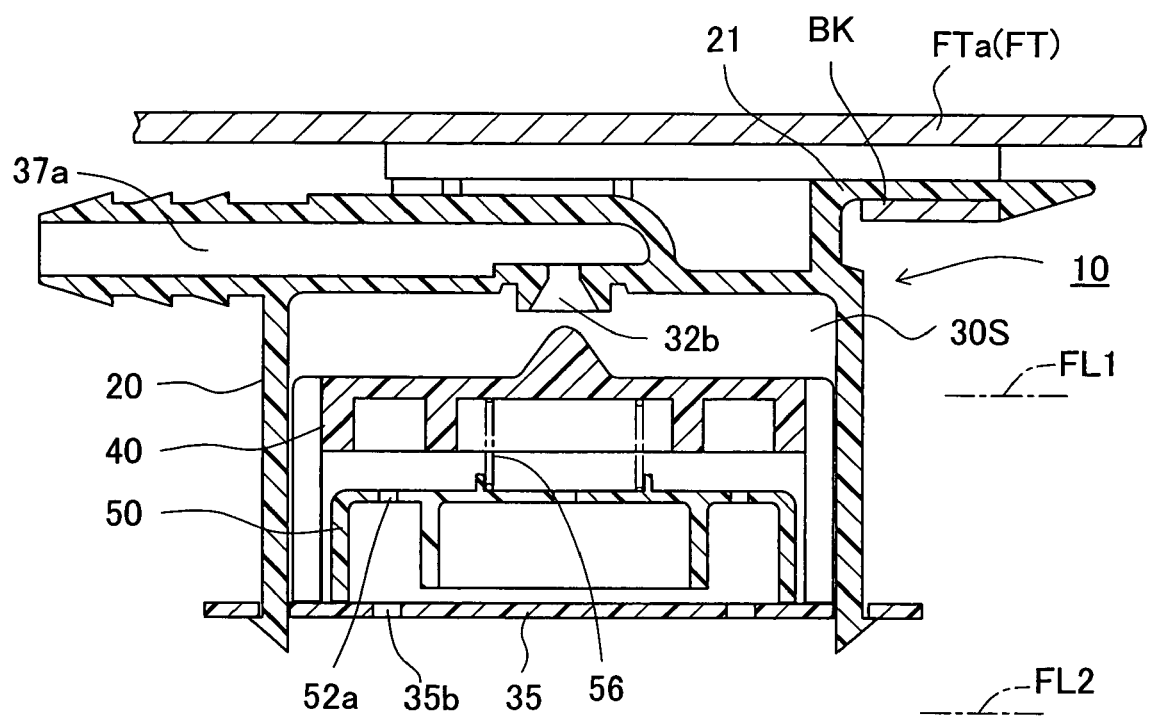
FIG. 1 is a sectional view schematically illustrating the structure of a fuel cutoff valve attached to an upper portion of a fuel tank of an automobile in a first embodiment of the invention.

FIG. 1 is a sectional view schematically illustrating the structure of a fuel cutoff valve 10 attached to an upper portion of a fuel tank FT of an automobile (not shown) in a first embodiment of the invention. The fuel cutoff valve 10 of the embodiment is designed as an in-tank structure set in the fuel tank FT. The fuel cutoff valve 10 works to prevent the outflow of a fuel from the fuel tank FT in the event of a rise of the fuel level in the fuel tank FT caused by, for example, a tilted attitude of the vehicle or a sudden turn of the vehicle. The fuel cutoff valve 10 includes a casing 20, a first part 40, a second part 50, and a spring 56 as main components. A valve mounting member 21 is integrally formed with and located above the casing 20 and is fastened to the inside of the fuel tank FT via a bracket BK welded to a lower face of an upper wall FTa of the fuel tank FT.

(2) Detailed Structures of Respective Parts of Fuel Cutoff Valve 10

Figure 2:
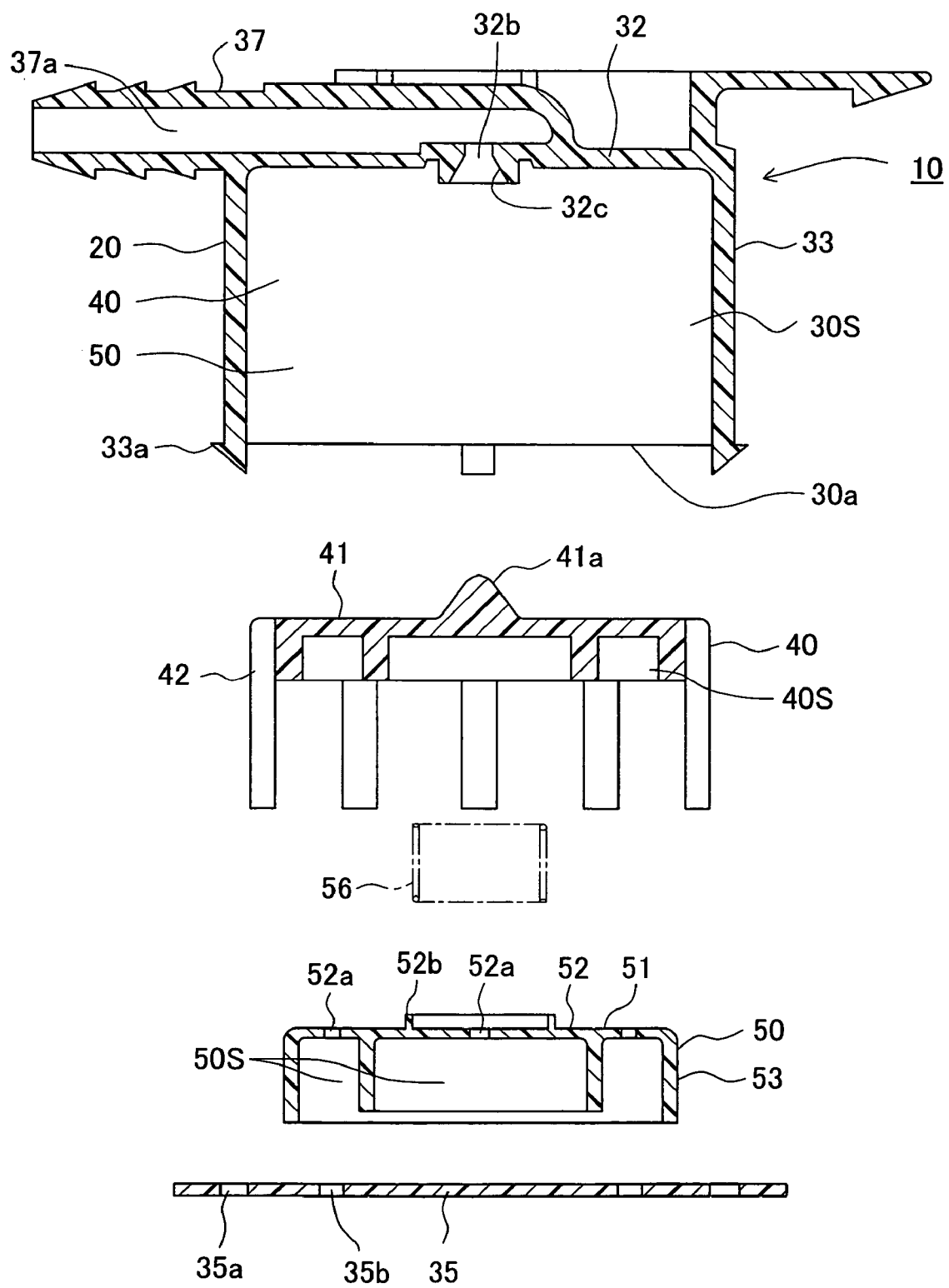
FIG. 2 is a decomposed sectional view illustrating the structure of the fuel cutoff valve of the first embodiment.

The respective parts of the fuel cutoff valve 10 have the structures and the functions as described below in detail. FIG. 2 is a decomposed sectional view illustrating the structure of the fuel cutoff valve 10.

(2)-1 Casing 20

The casing 20 includes a casing body 30 and a bottom plate 35 attached to the bottom of the casing body 30. The casing body 30 has a top wall 32 and a side wall 33 extended downward in a cylindrical shape from the top wall 32. The top wall 32 and the side wall 33 define a cup-shaped valve chest 30S having a bottom opening 30a. A connection conduit 32b runs through the center of the top wall 32 and has a seat element 32c formed to face the valve chest 30S. The bottom of the side wall 33 forms a catch claw 33a to fasten the bottom plate 35. The bottom plate 35 is attached to the casing body 30 to close the bottom opening 30a of the casing body 30. The catch claw 33a of the casing body 30 is fit in a fitting hole 35a formed along an outer circumference of the bottom plate 35 to close the bottom opening 30a of the casing body 30. A tubular member 37 rises from the middle of the top face of the casing body 30 and is extended in a horizontal direction. The tubular member 37 defines an upper conduit 37a having one end connected to the valve chest 30S via the connection conduit 32b of the casing body 30 and the other end connected to a canister.

(2)-2 First Float 40

Figure 3:
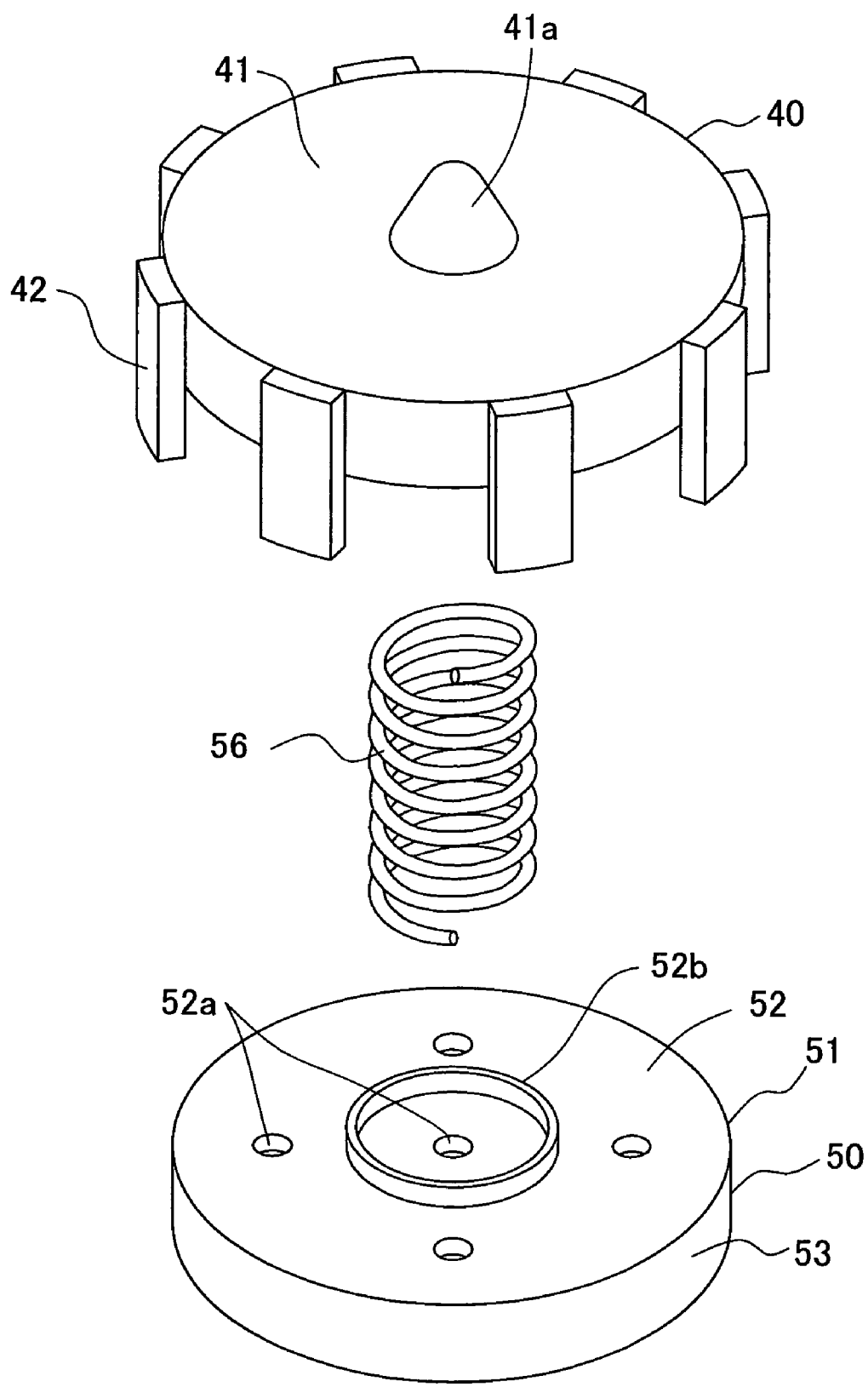
FIG. 3 is a decomposed perspective view illustrating the structure of the main part of the fuel cutoff valve.

FIG. 3 is a perspective view illustrating the structure of the first part 40 and the second part 50. The first part 40 has a disc-shaped top plate 41 and multiple (eight in the illustrated structure) legs 42 extended downward from the outer circumference of the top plate 41. The multiple legs 42 are alinged at equal intervals along the circumference of the top plate 41. As shown in FIG. 2, the bottom face of the top plate 41 forms a bottom-opened recess functioning as a buoyancy chamber 40S. The first part 40 is made of a material having a greater specific gravity (in a range of 0.75 to 1.5) than the specific gravity of the fuel, for example, polyacetal or polyamide. A substantially cone-shaped valve plug 41a is protruded from the center of the top plate 41 and is seated on and separated from the seat element 32c to close and open the connection conduit 32b.

(2)-3 Second Float 50

The second part 50 is located below and inside the first part 40. The second part 50 has a body 51 that is formed in a bottom-opened cup shape and includes a top plate 52 and a cylindrical side wall 53 extended downward from the outer circumference of the top plate 52. The body 51 includes a bottom-opened buoyancy chamber 50S. A spring support element 52b is formed on the upper face of the top plate 52 to hold a lower end of the spring 56. The first part 40 is accordingly held above the top plate 52 of the second part 50. The top plate 52 has one center air hole 52a and four peripheral air holes 52a (opening area: 0.2 mm.sup.2) to make the buoyancy chamber 50S communicate with the valve chest 30S. The second part 50 is made of a material having a greater specific gravity (in a range of 0.75 to 1.5) than the specific gravity of the fuel, for example, polyacetal, foamed polyacetal polyamide, or foamed polyamide. The specific gravity of the second part 50 is preferably in a range of 0.75 to 1.1, which is slightly greater than the specific gravity of the fuel. Setting the specific gravity of the second part 50 in this range ensures the smooth motion of the second part 50 to deflect the spring 56 and to make the first part 40 promptly close the connection conduit 32b in the event of an abrupt rise of the fuel level at a high increase rate.

(3) Operations of Fuel Cutoff Valve 10

(3)-1 Operation of Fuel Cutoff Valve 10 in Tilted Attitude of Vehicle

Figure 4:
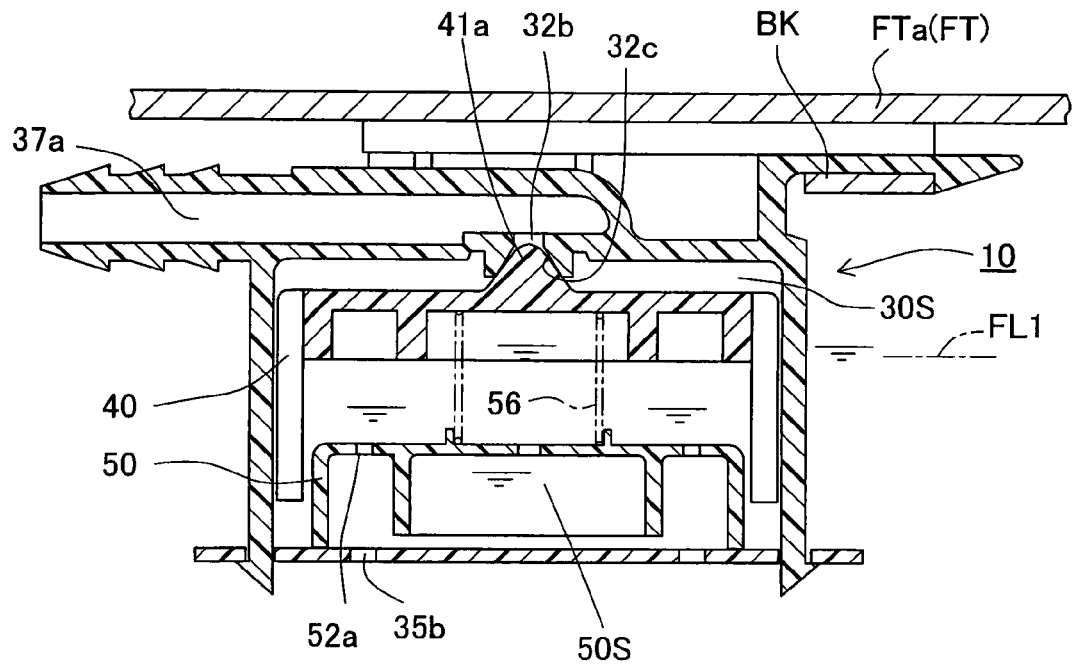
FIG. 4 shows the operation of the fuel cutoff valve in a tilted attitude of the vehicle.

FIG. 4 shows the operation of the fuel cutoff valve 10 in a tilted attitude of the vehicle. The fuel level gently rises in a tilted attitude of the vehicle on an inclined road surface, for example, on a slope, in the open position of the fuel cutoff valve 10 shown in FIG. 1. When the fuel level rises near the fuel cutoff valve 10, the fuel flows through a connection hole 35b of the bottom plate 35 into the valve chest 30S. In this state, the fuel level rises at a relatively low increase rate, and a large amount of the air comes out of the buoyancy chamber 50S via the air boles 52a of the second part 50. The little amount of the air left in the buoyancy chamber 50S does not increase the buoyancy of the second part 50. The low buoyancy of the second part 50 and the greater specific gravity of the second part 50 than the specific gravity of the fuel do not allow a rise of the second part 50. As shown in FIG. 4, at a reach of the fuel level to a preset fluid level FL1, the buoyancy of the buoyancy chamber 40S and the legs 42 raises the first part 40 and makes the valve plug 41a seated on the seat element 32c to close the connection conduit 32b. In response to a fall of the fuel level in the fuel tank FT, the first part 40 decreases its buoyancy and moves down to open the connection conduit 32b.

(3)-2 Operation of Fuel Cutoff Valve 10 in Roll of Vehicle

Figure 5:
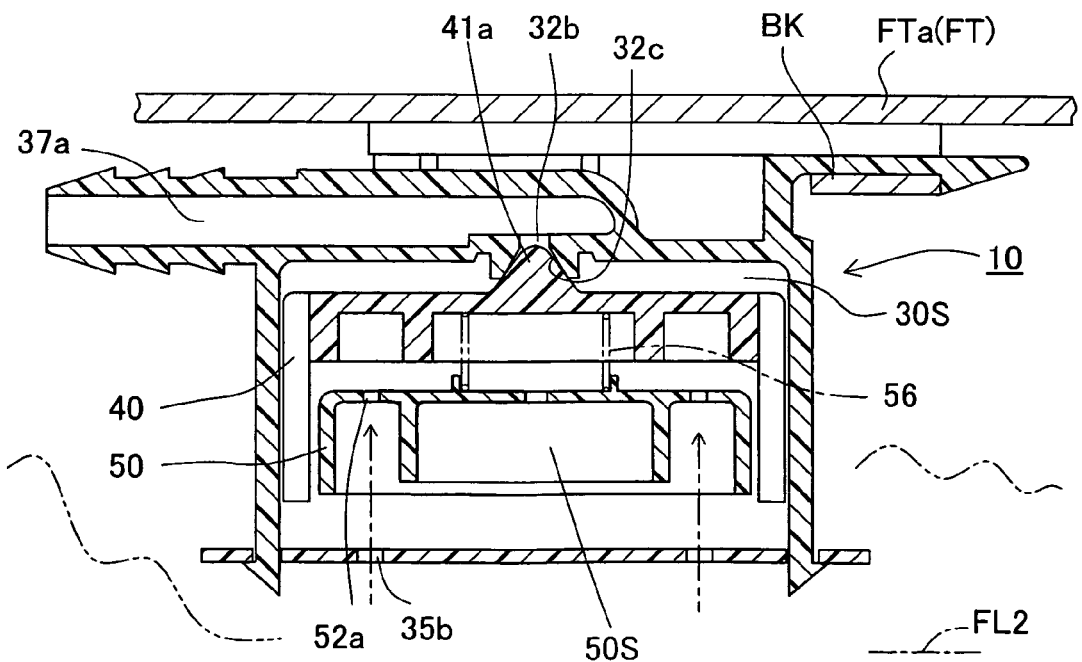
FIG. 5 shows the operation of the fuel cutoff valve in a roll of the vehicle by a sudden turn.

FIG. 5 shows the operation of the fuel cutoff valve 10 in a roll of the vehicle by a sudden turn. The fuel level in the fuel tank FT is close to a preset full fluid level FL2 and is ruffled as shown by the two-dot chain line in FIG. 5 in the roll of the fuel tank FT by a sudden turn of the vehicle. The fuel flows through the connection hole 35b of the bottom plate 35 into the valve chest 30S. In this state, the fuel level rises at a relatively high increase rate, and only a little amount of the air comes out of the buoyancy chamber 50S via the air holes 52a of the second part 50. This increases the buoyancy of the second part 50 by the air retained in the buoyancy chamber 50S. The increased buoyancy over the sum of the own weight of the second part 50 and the pressing force of the spring 56 deflects the spring 56 and allows a rise of the second part 50. The rising second part 50 presses the first part 40 up via the spring 56 and causes the valve plug 41a of the first part 40 to be seated on the seat element 32c and close the connection conduit 32b. This operation of the fuel cutoff valve 10 effectively prevents the outflow of the fuel from the fuel tank FT in the event of an abrupt rise of the fuel level in the fuel tank FT by a sudden turn of the vehicle.

(3)-3 Operation of Fuel Cutoff Valve 10 in Turnover of Vehicle

Under the condition of a turnover of the vehicle, the fuel cutoff valve 10 is positioned upside down and is submerged in the fuel. Both the first part 40 and the second part 50 have the greater specific gravities than the specific gravity of the fuel and accordingly go down in the fuel. The sinking second part 50 presses down the first part 40 via the spring 56 and causes the valve plug 41a of the first part 40 to be seated on the seat element 32c and close the connection conduit 32b. This operation of the fuel cutoff valve 10 effectively prevents the outflow of the fuel from the fuel tank FT in a turnover of the vehicle.

(4) Functions and Effects of Fuel Cutoff Valve 10

The fuel cutoff valve 10 of the above structure has the functions and the effects discussed below.

(4)-1. In the event of a rise of the fuel level at a relatively low increase rate in a tilted attitude of the vehicle, the first part 40 quickly increases to close the connection conduit 32b and thereby prevents the outflow of the fuel from the fuel tank FT. At a higher fuel level than the fuel level submerging the second part 50, only the first part 40 moves up and down to close and open the connection conduit 32b. The structure of the embodiment is thus desirably applicable to a flat fuel tank having a fuel cutoff valve set in a closed position at a higher fuel level.

(4)-2. In the event of an abrupt rise of the fuel level at a high increase rate, for example, by a sudden turn of the vehicle, the second part 50 receives both the rising force by the collision of the fuel level and the rising force by the buoyancy of the air that hardly comes out of the buoyancy chamber 50S via the air holes 52a but is mostly retained in the buoyancy chamber 50S. The rising second part 50 presses up the first part 40 via the spring 56 and causes the valve plug 41a of the first part 40 to be seated on the seat element 32c and promptly close the connection conduit 32b.

(4)-3. In the structure of the fuel cutoff valve 10 of the embodiment, the first part 40 is directly held via its legs 42 on the bottom plate 35, and the second part 50 is placed in the inner space of the first part 40. The height of the fuel cutoff valve 10 accordingly does not depend upon the height of the second part 50. Compared with the prior art structure having the second float held above the first float via the spring, this structure of the embodiment lowers the overall height of the fuel cutoff valve 10 and flattens the fuel tank FT.

(4)-4. In the event of an abrupt rise of the fuel level by a sudden turn of the vehicle, the rising force of the second part 50 is convened into the pressing force of the spring 56 and strongly presses the first part 40 up in the valve-closing direction. This ensures the high sealing property even under the condition of a heavy ruffle of the fuel level.

(4)-5. The legs 42 of the first part 40 are submerged in the fuel in a tilted attitude of the vehicle to have a contribution to the buoyancy. This decreases the required volume of the buoyancy chamber 40S, so as to reduce the size of the first part 40 and the overall size of the fuel cutoff valve 10 and flatten the fuel tank FT.

The embodiment discussed above is to be considered in all aspects as illustrative and not restrictive. There may be many modifications, changes, and alterations without departing from the scope or spirit of the main characteristics of the present invention. Some examples of possible modification are given below.

Figure 6:
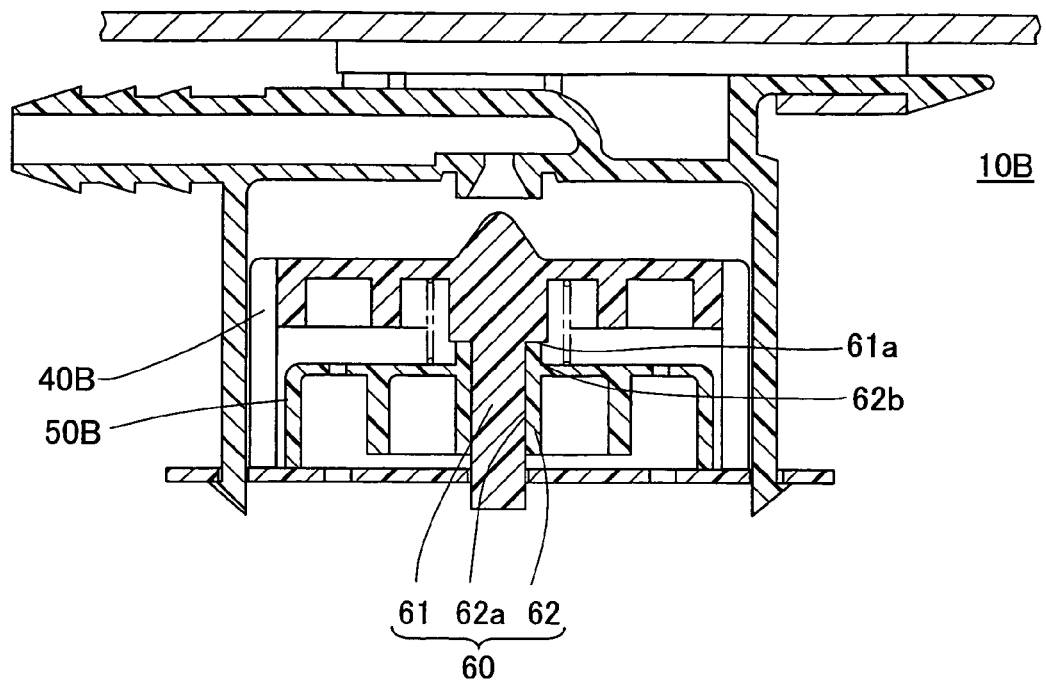
FIG. 6 is a sectional view schematically illustrating the structure of another fuel cutoff valve in a second embodiment of the invention.

FIG. 6 is a sectional view schematically illustrating the structure of another fuel cutoff valve 10B in a second embodiment of the invention. The fuel cutoff valve 10B of the second embodiment is characteristic of the structure of a guide mechanism 60 to support a first float 40B and a second float 50B. The guide mechanism 60 includes a guide projection 61 that is protruded downward from the center of a lower face of the first part 40B, and a cylindrical guide member 62 that is formed in the second part 50B and has a trough hole 62a to support the guide element 61 in a slidably movable manner. In addition to the functions and the effects of the structure of the first embodiment, the guide mechanism 60 of the second embodiment ensures the accurate positioning of the first part 40B and the second part 50B moving up and down. In the event of an abrupt rise of the fuel level in the fuel tank by a sudden turn of the vehicle, the second part 50B rises to make an upper end 62b of the cylindrical guide member 62 press up a step 61a of the guide projection 61. In the structure of the second embodiment, the second part 50B directly presses the first part 40B up to ensure the quick valve-closing effect in the event of an abrupt rise of the fuel level by a sudden turn of the vehicle.

Figure 7:
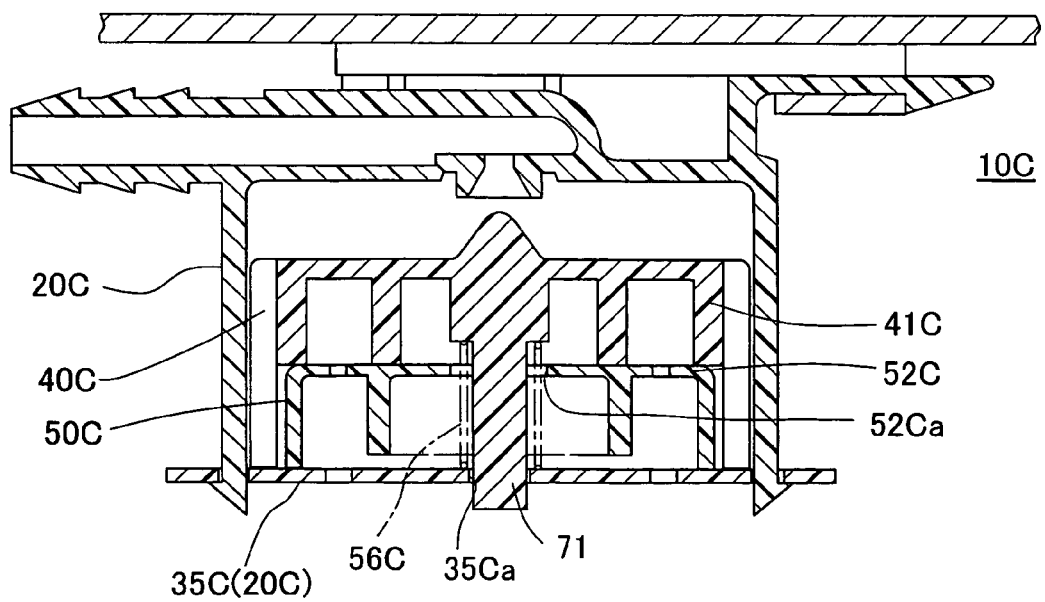
FIG. 7 is a sectional view schematically illustrating the structure of still another fuel cutoff valve in a third embodiment of the invention.

FIG. 7 is a sectional view schematically illustrating the structure of still another fuel cutoff valve 10C in a third embodiment of the invention. The fuel cutoff valve 10C of the third embodiment is characteristic of the structure of a spring 56C for supporting a first part 40C. A guide projection 71 is protruded downward from the center of a lower face of the first part 40C. The guide projection 71 goes through a through hole 52Ca of a second part 50C and through an aperture 35Ca of a bottom plate 35C of a casing 20C to be held by the bottom plate 35C in a slidably movable manner. The spring 56C is placed on an upper face of the bottom plate 35C and goes through the through hole 52Ca of the second part 50C to bold a lower portion of the first part 40C. In the event of an abrupt rise of the fuel level by a sudden turn of the vehicle, the second part 50C rises to make a top plate 52C of the second part 50C press up a lower end of a top plate 41C of the first part 40C. Like the structure of the second embodiment, in the structure of the third embodiment, the second part 50C directly presses the first part 40C up to ensure the quick valve-closing effect in the event of an abrupt rise of the fuel level by a sudden turn of the vehicle.

In any of the structures of the first to the third embodiments, the second part is not supported by the spring. One possible modification may structure the second part to be supported by a spring and thereby reduces the apparent specific gravity of the second part.

Any of the above embodiments regards the in-tank structure of the fuel cutoff valve that is located inside the fuel tank. The technique of the invention is, however, not restricted to this in-tank structure but is also applicable to a fuel cutoff valve of another structure, which is attached to an upper wall of a fuel tank and has a lower portion inserted in a fitting hole formed in the upper wall of the fuel tank. In any of the structures of the first to the third embodiments, the fuel cutoff valve is attached to the iron fuel tank FT via the bracket BK. The technique of the invention is also applicable to various fuel tanks made of polyethylene-containing composite material. The casing of the fuel cutoff valve is thermally welded to the fuel tank of the composite material. This structure does not require the bracket and thus desirably reduces the total number of the required parts.

The foregoing detailed description of the invention has been provided for the purpose of explaining the principles of the invention and its practical application, thereby enabling others skilled in the art to understand the invention for various embodiments and with various modifications as are suited to the particular use contemplated. The foregoing detailed description is not intended to be exhaustive or to limit the invention to the precise embodiments disclosed. Modifications and equivalents will be apparent to practitioners skilled in this art and are encompassed within the spirit and scope of the appended claims.

What is claimed is:

1. A fuel cutoff valve that is attached to an upper portion of a fuel tank and connects and disconnects inside with and from an outside of the fuel tank according to a fuel level in the fuel tank, the fuel cutoff valve comprising:
   a casing that has a casing body forming a valve chest to communicate with the inside of the fuel tank and a connection conduit connecting the valve chest to the outside of the fuel tank;
   a first part that is received in the valve chest in a vertically movable manner and has a valve plug, the valve plug being configured to open and close the connection conduit by the vertical movement of the first part; and
   a second part that is made of a material having a greater specific gravity than a specific gravity of the fuel and has a body located below the first part in a vertically movable manner to form a buoyancy chamber and an air hole formed in an upper portion of the body to communicate the buoyancy chamber with a space under the first part, wherein
   the fuel cutoff valve is configured such that the first part rises by buoyancy and closes the connection conduit in response to a rise of a fuel level,
   the second part has a resting state and a moving action in response to rise of the fuel level at a first preset rising rate and second preset rising rate higher than the first preset rising rate respectively,
   the resting state being a state that the second part makes the air come out of the buoyancy chamber via the air hole and interferes with an increase in buoyancy of the buoyancy chamber, and rests at an original position,
   the moving action being an action that the second part retains the air in the buoyancy chamber and rises by increased buoyancy of the buoyancy chamber, and presses the first part up, and then makes the valve plug of the first part close the connection conduit,
   the first part is held by a spring placed on an upper face of the second part, and
   the first part comprises a top plate with the valve plug and multiple leg elements extended downward from an outer circumference of the top plate and arranged to surround an outer circumference of the second part.

2. The fuel cutoff valve in accordance with claim 1, wherein the first part further comprises a guide mechanism that is protruded from a lower portion of the first part and is held by the casing and the second part.

3. The fuel cutoff valve in accordance with claim 1, wherein the casing has a bottom plate to support a lower end of the second part, and the first part is held by a spring placed on an upper face of the bottom plate.

4. The fuel cutoff valve in accordance with claim 1, wherein the second part is configured to directly press the first part up at the second preset rising rate of the fuel level.

* * * * *